United States Patent [19]

Malafosse et al.

[11] 4,298,585

[45] Nov. 3, 1981

[54] PROCESS OF MAKING SODIUM PERBORATE

[75] Inventors: Jean Malafosse, Sassenage; André Girou, Toulouse; Hervé Olivier, Santenay-les-Bains; Michel Dupont, Chagny, all of France

[73] Assignee: L'Air Liquide, Societe Anonyme pour l'Etude et l'Exploitation des Procedes Georges Claude, Paris, France

[21] Appl. No.: 140,703

[22] Filed: Apr. 16, 1980

[30] Foreign Application Priority Data

May 3, 1979 [FR] France ................................ 79 11090

[51] Int. Cl.³ .............................................. C01B 15/12
[52] U.S. Cl. ................................... 423/279; 423/268; 423/281
[58] Field of Search ............... 423/268, 279, 280, 281, 423/415 P

[56] References Cited

U.S. PATENT DOCUMENTS

| | | | |
|---|---|---|---|
| 3,883,640 | 5/1975 | Smart | 423/415 P |
| 3,983,223 | 9/1976 | Janzon et al. | 423/415 P |
| 4,071,462 | 1/1978 | Matsunaga et al. | 423/277 X |
| 4,118,465 | 10/1978 | Malfosse | 423/415 P |
| 4,131,562 | 12/1978 | Lutz | 423/415 P |
| 4,215,097 | 7/1980 | Brichard et al. | 423/268 X |

FOREIGN PATENT DOCUMENTS

| | | |
|---|---|---|
| 1060849 | 7/1959 | Fed. Rep. of Germany . |
| 1240805 | 5/1967 | Fed. Rep. of Germany . |
| 944121 | 12/1963 | United Kingdom . |

*Primary Examiner*—G. O. Peters
*Attorney, Agent, or Firm*—Browdy and Neimark

[57] ABSTRACT

In a process of making sodium perborate, crystallization is performed in the presence of an organic polymer with a high potential content of free carboxylic groups derived from maleic anhydride, selected from the copolymers of maleic anhydride with an organic compound with an ethylene bond. The process is applicable to obtaining sodium perborate crystals of high apparent density of good resistance to abrasion and of limited, relatively high granulometric size.

7 Claims, No Drawings

PROCESS OF MAKING SODIUM PERBORATE

FIELD OF INVENTION

This invention relates to a process of making sodium perborate, in particular to produce an improved structure meeting present commercial requirements.

BACKGROUND OF INVENTION

Sodium perborate is obtained commercially by addition of hydrogen peroxide to a sodium metaborate solution at a temperature close to 20° C. according to the continuous or batch fabrication methods. It is a peroxide of the formula:

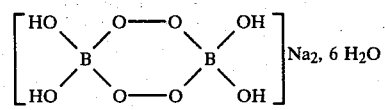

To obtain a good yield in relation to the hydrogen peroxide and a chemically stable perborate, synthesis is performed in the presence of magnesium salt. It is known that the $Mg^{++}$ cation is a good stabilizing agent of active peroxide oxygen in an alkaline medium; but this additive has an undesirable action on the crystallization of sodium perborate. The magnesium cation modifies the crystalline aspect of the sodium perborate by favoring the formation of platelets of increasingly small thickness as a function of the increase of the $Mg^{++}$ concentration. These platelets agglomerate and build up in very fragile, disordered structures. Consequently, the physical characteristics of the resultant sodium perborate are not those corresponding to a valuable commercial product for which market demand is now oriented, i.e. dense and mechanically resistant crystals are not produced.

SUMMARY OF INVENTION

A crystallization modifier has been found which eliminates the formation of fragile structures effected by magnesium, while making it possible to obtain compact crystallization, and thereby obtain a sodium perborate structure having good mechanical resistance and an apparent density that meets the specification of manufacturers of washing, e.g. detergent, compositions.

There has been found a class of crystallization modifiers particularly suited to the crystallization of sodium perborate and which, in an unexpected way, eliminate the undesired fragilizing action of the magnesium cation whose presence is essential for the chemical stability of the peroxide compound. These modifiers lead to the obtention of crystals with high apparent density, good resistance to abrasion, and of limited, relatively high granulometric size. It has even been found that in the presence of some of these modifiers, the crystallization is oriented toward a specific crystallization formation known as the "cocoon" formation.

According to the process of the invention, crystallization of the sodium perborate is performed in the presence of a polycarboxylic polymer.

DETAILED DESCRIPTION OF EMBODIMENTS

It has been found that the incorporation in the crystallization medium of small amounts of an organic polymer or copolymer that is water soluble or soluble in an alkaline medium, whose molecule contains effectively or potentially numerous carboxylic acid groups —COO⁻, strongly modifies the morphology of the crystalline sodium perborate agglomerates, even in the presence of relatively large amounts of magnesium cation.

Of the organic polymers with a high potential content of free carboxylic groups, maleic anhydride derivatives have a very favorable influence on sodium perborate crystallization; copolymers of maleic anhydride with an organic compound having an ethylene bond such as ethylene, propylene, isobutylene, styrene, methoxyvinyl ether, furan . . . are excellent agents for improving the physical characteristics of sodium perborate crystals.

The most effective macromolecules are those derived from maleic anhydride and vinyl methyl ether according to the formula:

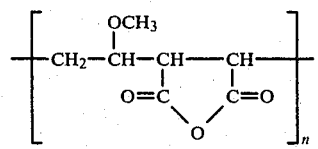

sold under the trademark "GANTREZ." The ranges of the molecular weights of the commercial products extend from 100,000 to 2,000,000; preferably products are used with the highest molecular weights, greater than 500,000.

Polymers derived from ethylene and maleic anhydride are also particularly effective; these products are sold under the trademark "EMA", and the most active are those with the highest molecular weights. They have the formula:

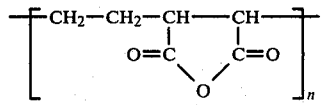

An interesting modification is obtained in the morphology of the sodium perborate crystalline agglomerates with a polymer concentration of between 10 and 1,000 ppm in the perborate crystallization medium, and preferably between 50 and 300 ppm.

Examples are given below which illustrate the invention in a non-limiting way.

EXAMPLE 1—Laboratory Study

A batch operation was performed by adding, in stoichiometric amount, industrial hydrogen peroxide in a 70% concentration by weight to metaborate solution $NaBO_2$ containing varying amounts of $Mg^{++}$ cation and polycarboxylic polymer; the concentration of the mother solution was such that the crystallization medium contained 40 g/l $NaBO_2$. Hydrogen peroxide was added in less than 3 minutes; it was allowed to crystallize, with stirring, at 20° C. The resultant crystals were submitted to centrifugal draining and were dried in an oven at 35° C. The apparent density of the resulting powder was measured and it was subjected to examination with a scanning electron microscope.

As noted above, the crystallization medium contained variable amounts of $Mg^{++}$ cation and polycarboxylic polymer, in this case a copolymer of maleic anhydride and vinyl methyl ether sold under the trademark "GANTREZ AN 169" and the average molecular weight of which is 1,125,000. The respective portions of the two additions are indicated in the table of results below wherein the tabulated values correspond to the apparent density of the sodium perborate crystals produced.

The amounts of magnesium $Mg^{++}$ are expressed in mg per liter of crystallization medium and the amounts of "GANTREZ" Gan mg/l are also indicated in mg per liter of crystallization medium.

| $Mg^{++}$ mg/l | Gan 169 mg/l | | | | |
|---|---|---|---|---|---|
| | 0 | 20 | 50 | 100 | 200 |
| 0 | 0.4 | 0.55 | 0.58 | 0.63 | 0.72 |
| 10 | 0.33 | 0.50 | | 0.63 | 0.72 |
| 20 | 0.31 | | | 0.60 | |
| 50 | 0.29 | | 0.45 | 0.57 | 0.71 |
| 100 | 0.26 | | 0.33 | 0.38 | 0.53 |

The first line of the table shows the increase of the apparent density linked to the increase of the "GANTREZ" concentration in the crystallization medium. The first column shows the opposite effect of the addition of increasing amounts of $Mg^{++}$ in the absence of "GANTREZ". The other data of the table show that additions of "GANTREZ", so that the concentration of the crystallization medium is 100 or 200 mg/l, makes it possible to obtain respectively apparent densities from 0.6 or greater to 0.7 at $Mg^{++}$ concentrations between 0 and 50 mg/l.

Photographs obtained under scanning electron microscope show the evaluation of the morphology of the crystalline agglomerates for increasing addition of "GANTREZ" and/or $Mg^{++}$.

If perborate crystallization is performed without any additive, there are obtained crystalline build-ups of small size that are not very resistant to abrasion because they are made up of agglomerated platelets in a disordered and lacunary manner. This is apparent from inspection at a magnification of 150X of crystals formed without $Mg^{++}$ and without "GANTREZ".

As soon as even the slightest amount of "GANTREZ" is added to the medium, it is found that the structure becomes more compact, less lacunary; the particles are coarser and the density and resistance to abrasion increase. This is apparent from inspection of crystals magnified 100x made, respectively, in the presence of no $Mg^{++}$ and 20 mg/l and 100 mg/l of "GANTREZ".

If the "GANTREZ" concentration is increased to 200 ppm, a compact "cocoon" structure is obtained; the resulting powder is hard, with good granulometry and resistance to abrasion, as is apparent from inspection at 100X of crystals formed in the presence of 0 $Mg^{++}$ and 200 mg/l of "GANTREZ". Inspection of crystals made without "GANTREZ" and in the presence, respectively, of 10 mg/l $Mg^{++}$, 50 mg/l $Mg^{++}$ and 100 mg/l $Mg^{++}$, show the effect of an increasing addition of $Mg^{++}$; it is seen that this additive modifies the crystalline characteristics, probably by preferential absorption on one of the faces of the crystal, and thereby favors the formation of platelets of increasingly smaller thickness and size as the $Mg^{++}$ concentration increases. These fine platelets build up in a fragile, disordered agglomerate; these characteristics, not very favorable to obtaining a commercially valuable product, are more apparent in the crystals formed in the presence of $Mg^{++}$ than for perborate obtained in a pure medium.

Addition of "GANTREZ" makes it possible to correct this unfavorable effect of $Mg^{++}$; inspection of samples made in the presence of 50 mg/l of $Mg^{++}$ and, respectively, 50 mg/l GANTREZ, 100 mg/l GANTREZ and 200 mg/l GANTREZ, show the effect of addition of increasing amounts of "GANTREZ" to a crystallization medium containing 50 ppm of $Mg^{++}$; it is seen that even with only 100 ppm of polymer a very compact morphology is obtained, and that with 200 ppm a cocoon structure is provided. Inspection of samples made in the presence of 100 mg/l of $Mg^{++}$ and, respectively, 50 mg/l and 200 mg/l of GANTREZ show the less marked but evident effect of additions of "GANTREZ" to a crystallization medium containing 100 ppm of $Mg^{++}$.

EXAMPLE 2

The operation was in a continuous industrial crystallizer of truncated conical shape, provided with devices for addition of reagents for recycling of liquors and for drawing off of solid so that a granulometric sorting is obtained to effect controlled enlargement of the fines and extraction of a powder product of commercially suitable granulometry. This apparatus is described in French Pat. No. 1,475,801.

The metaborate solution used was made from boron ores such as razorite or tincal, and caustic soda; the hydrogen peroxide used was the commercial solution at 70° by weight. At 20° C., in the presence of $Mg^{++}$ at a concentration of 100 mg/l, a perborate is obtained having an apparent density of 0.67–0.68. When there is added thereto a solution of 20 g/l of "GANTREZ AN 169" in mother liquor at such a delivery rate that the proportion of polymer in relation to the amount of perborate produced is between 150 and 200 ppm, the resulting perborate has an apparent density of 0.72–0.75.

EXAMPLE 3

Crystallization was performed in the laboratory under the conditions of Example 1 but by replacing the "GANTREZ AN 169" with a copolymer of ethylene and maleic anhydride sold under the trademark "E M A 31"; the operation was in the presence of 50 mg/l of $Mg^{++}$ and 200 ppm of "E M A". The apparent density of the resulting perborate was 0.73.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a process of making sodium perborate hexahydrate crystals comprising reacting hydrogen peroxide with a sodium metaborate solution, the improvement wherein the crystallization of the sodium perborate is performed in the presence of a carboxylic polymer having a high potential content of free carboxylic acid groups, said polymer being a maleic anhydride copolymer with an organic compound having an ethylene bond.

2. Process of making sodium perborate according to claim 1, wherein the polymer is a copolymer of maleic anhydride with vinyl methylether.

3. Process of making sodium perborate according to claim 1, wherein the polymer is a copolymer of maleic anhydride with ethylene.

4. Process of making sodium perborate according to any of claims 1 to 3, wherein the polymer has a molecular weight greater than 500,000.

5. Process of making sodium perborate according to any of claims 1 to 3, wherein the concentration of polymer in the sodium perborate crystallization medium is between 10 and 1,000 ppm.

6. Process of making sodium perborate according to claim 4, wherein the concentration of polymer in the sodium perborate crystallization medium is between 50 and 300 ppm.

7. In a process of making sodium perborate hexahydrate crystals comprising reacting hydrogen peroxide with a sodium metaborate solution in the presence of $Mg^{++}$ ion, the improvement for producing dense and mechanically resistant perborate crystal comprising effecting said crystallization in the presence of 10–1000 ppm based on the perborate crystallization medium of a high M.W. carboxylic polymer having a high potential content of free carboxylic acid groups, said polymer being a maleic anhydride copolymer with an organic compound having an ethylene bond.

* * * * *